United States Patent
Satake et al.

(10) Patent No.: US 12,229,287 B2
(45) Date of Patent: Feb. 18, 2025

(54) AUTOMATIC RESOURCE ACCESS POLICY GENERATION AND IMPLEMENTATION

(71) Applicant: International Business Machines Corporation, Armonk, NY (US)

(72) Inventors: Yuki Satake, Tokyo (JP); Mingqin Xu, Tokyo (JP); Aya Nakashima, Tokyo (JP); Tatsuki Sawada, Chiba (JP); Junichi Hanzawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 17/452,084

(22) Filed: Oct. 25, 2021

(65) Prior Publication Data

US 2023/0129276 A1   Apr. 27, 2023

(51) Int. Cl.
*G06F 21/62* (2013.01)

(52) U.S. Cl.
CPC ................ *G06F 21/6209* (2013.01)

(58) Field of Classification Search
CPC .................................... G06F 21/6209
See application file for complete search history.

(56) References Cited

U.S. PATENT DOCUMENTS

| | | | |
|---|---|---|---|
| 10,484,378 B2 | 11/2019 | Smith et al. | |
| 2005/0232423 A1* | 10/2005 | Horvitz | G06F 21/6218 380/255 |
| 2011/0252456 A1* | 10/2011 | Hatakeyama | H04L 67/306 726/1 |
| 2018/0084012 A1* | 3/2018 | Joseph | H04L 63/1425 |
| 2018/0247241 A1 | 8/2018 | Avrahami et al. | |
| 2018/0288061 A1 | 10/2018 | Byrne et al. | |
| 2019/0050476 A1* | 2/2019 | Florentino | G06F 16/34 |
| 2020/0053090 A1* | 2/2020 | Kliger | G06F 18/214 |
| 2020/0257810 A1* | 8/2020 | Vrabec | G06F 21/53 |

FOREIGN PATENT DOCUMENTS

CN    112149806 A    12/2020

OTHER PUBLICATIONS

Tomoyo Linux, "A security module for system analysis and protection," accessed Oct. 20, 2021, 1 page. https://tomoyo.osdn.jp/index.html.en.

* cited by examiner

*Primary Examiner* — Vance M Little

(74) *Attorney, Agent, or Firm* — Yee & Associates, P.C.

(57) ABSTRACT

Automatically generating and implementing access policies is provided. An output of a needed user access context to access a resource is obtained from a trained machine learning model based on an extracted attribute of the resource input into the trained machine learning model. The access to the resource by a user is controlled using the output of the needed user access context to access the resource as an access policy for the resource.

22 Claims, 12 Drawing Sheets

AUTOMATIC RESOURCE ACCESS POLICY GENERATION AND IMPLEMENTATION

BACKGROUND

1. Field

The disclosure relates generally to access control and more specifically to automatically generating and implementing access policies for context-based access control to protected resources.

2. Description of the Related Art

Access control is selective restriction of access to resources, such as, for example, protected documents, files, hardware, software, and the like containing sensitive material, information, or data. The act of accessing may mean consuming or using. Permission to access a resource is called authorization. Authorization is a function of specifying user access rights or privileges to protected resources. To authorize a user to access a particular resource is to define an access policy.

As new work styles, such as, for example, working remotely, sharing office space, and the like, are becoming more popular and widespread, requirements for appropriate access control to protected resources are changing with an increase in diversity of work styles. One access control mechanism, role-based access control controls access to protected resources according to an assigned role of a user who is requesting access to a protected resource. For example, a user who is assigned a role of "administrator" can access a protected document in any way, such as read, update, and delete, while a user who is assigned a role of "normal user" is not allowed to edit the protected document but only view the document. However, in the new styles of working, using role-based access control may not provide sufficient resource security. For example, a situation may arise where a user who is authorized to access a particular resource is in the same room as a user who is not authorized to access that particular resource. Also, a situation may arise where an authorized user is requesting access a protected resource from an unauthorized location (e.g., restaurant) where other may view the protected resource. In both situations above, role-based access control would grant access to the resource without appropriate resource security.

Another access control mechanism is context-based access control. Based on a plurality of predefined access control policies, context-based access control determines whether a user's context, while requesting access to a protected resource, satisfies one of the plurality of pre-defined access control policies. If so, access is granted. If not, access is denied. However, current context-based access control systems have issues due to the large number of access control policies needed to be defined for resource access. For example, using current context-based access controls a set of policies must be predefined for each protected resource. The number of user access contexts for each protected resource can be quite large. Each policy is expressed by a combination of these user access contexts. In other words, the number of required access policies is at least the number of resources times M, where M is two to the power of the number of pre-defined access contexts. Thus, the number of types of contexts is too large to predefine manually by a user, such as, for example a security analyst, system administrator, or the like. As a result, context-based access control may not allow an otherwise authorized user to access a particular resource due to a lack of a predefined user access context that matches a current context of the user requesting access to that particular resource.

SUMMARY

According to one illustrative embodiment, a computer-implemented method for automatically generating and implementing access policies is provided. A computer obtains an output of a needed user access context to access a resource from a trained machine learning model based on an extracted attribute of the resource input into the trained machine learning model. The computer controls the access to the resource by a user using the output of the needed user access context to access the resource as an access policy for the resource. According to other illustrative embodiments, a computer system and computer program product for automatically generating and implementing access policies are provided. As a result, the illustrative embodiments provide a technical effect and practical application in the field of resource access control by increasing security of resources utilizing user access contexts needed by users when requesting access to the resources.

In addition, the illustrative embodiments optionally associate a user access context at an access to the resource by a trusted user who is authorized to access the resource with the attribute of the resource, record association between the user access context and the attribute of the resource, and input the user access context and the attribute of the resource as training data into a machine learning model to form the trained machine learning model. As a result, the illustrative embodiments increase performance of the computer to protect the resources using a trained machine learning model to automatically generate and implement access policies with needed user access contexts.

DETAILED DESCRIPTION

Figure 1:
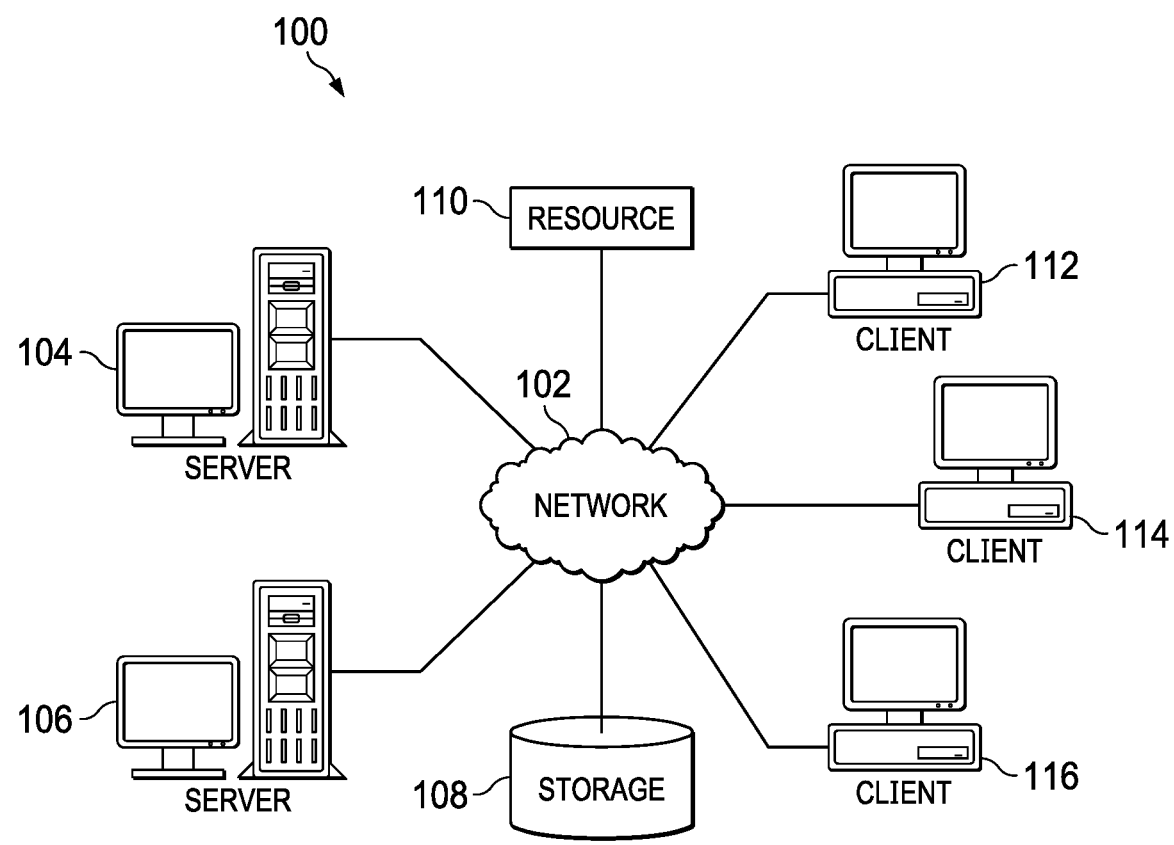
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
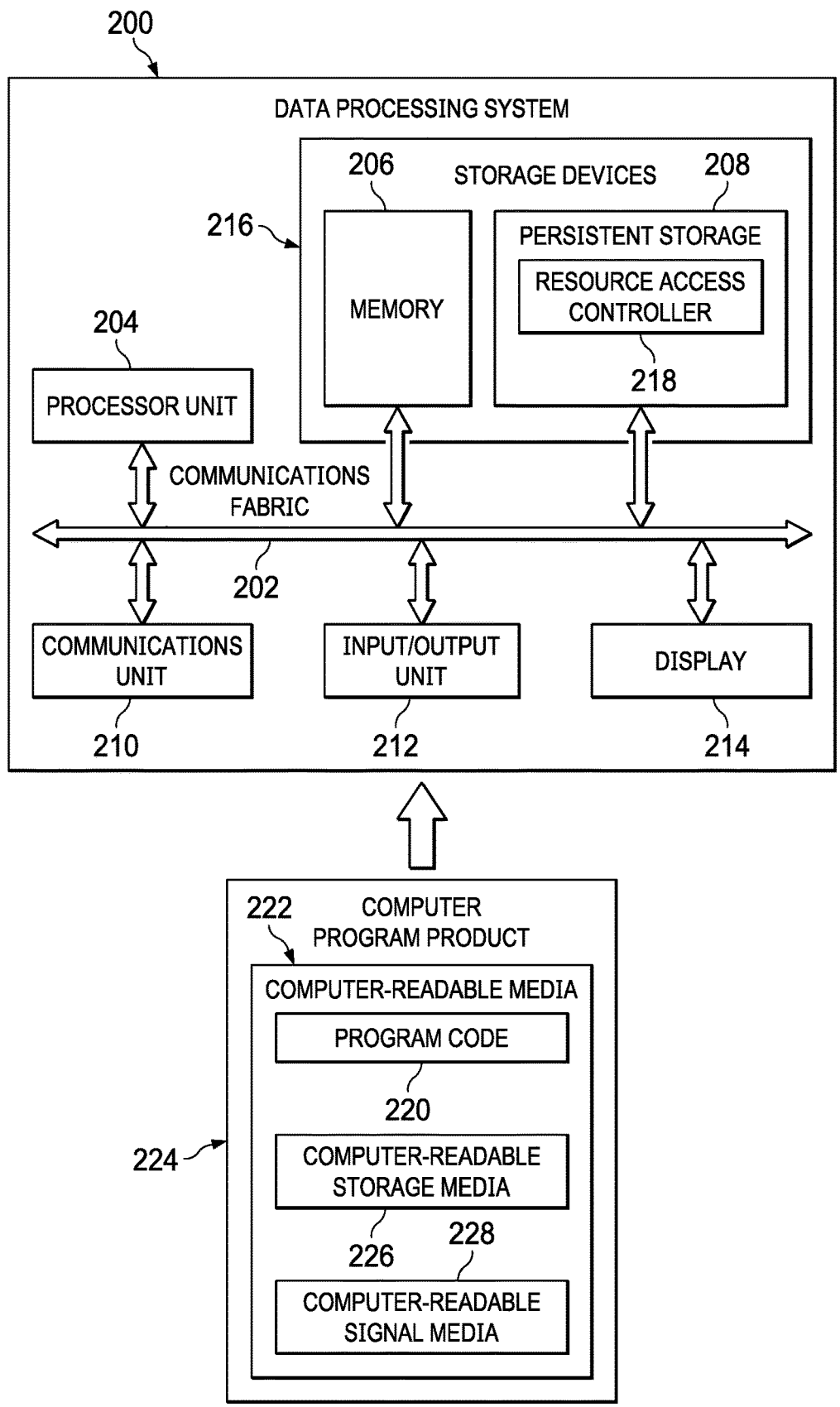
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 control access to resource 110 by client device users. Resource 110 represents a set of protected resources. The set of protected resources may correspond to an entity, such as, for example, an enterprise, company, business, organization, institution, agency, or the like. A protected resource requires user authorization prior to access. Resource 110 may be, for example, a protected document, set of data, database, storage device, secure memory, processor, computer, network, network device, application, or the like. Server 104 and server 106 control access to resource 110 by automatically generating and implementing user access context-based policies using a trained machine learning.

Client 112, client 114, and client 116 also connect to network 102. Clients 112, 114, and 116 are clients of server 104 and server 106. In this example, clients 112, 114, and 116 are shown as desktop or personal computers with wire communication links to network 102. However, it should be noted that clients 112, 114, and 116 are examples only and may represent other types of data processing systems, such as, for example, network computers, laptop computers, handheld computers, smart phones, smart glasses, smart televisions, smart vehicles, and the like. Users of clients 112, 114, and 116 may, for example, utilize clients 112, 114, and 116 to perform job duties and access resource 110, which is protected by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of client devices, identifiers for a plurality of client device users, resource profiles (e.g., identifiers, attributes, and the like), access policies, and the like. Furthermore, storage 108 may store other types of data, such as authentication or credential data that may include usernames, passwords, biometric data, and the like associated with, for example, client device users, system administrators, security analysts, and the like.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 112 over network 102 for use on client 112.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the resource access control processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores resource access controller 218. However, it should be noted that even though resource access controller 218 is illustrated as residing in persistent storage 208, in an alternative illustrative embodiment resource access controller 218 may be a separate component of data processing system 200. For example, resource access controller 218 may be a hardware component coupled to communication fabric 202 or a combination of hardware and software components. In another alternative illustrative embodiment, a first set of components of resource access controller 218 may be located in data processing system 200 and a second set of components of resource access controller 218 may be located in a second data processing system, such as, for example, server 106 in FIG. 1.

Resource access controller 218 controls access to one or more protected resources, such as, for example, resource 110 in FIG. 1, using user access context-based access control policies. In addition, resource access controller 218 instructs an access policy generator to automatically generate and implement a user access context-based access control policy for a particular resource when such a policy does not currently exist for that particular resource. As a result, data processing system 200 operates as a special purpose computer system in which resource access controller 218 in data processing system 200 enables selective access control to protected resources by client device users for increased resource security. In particular, resource access controller 218 transforms data processing system 200 into a special purpose computer system as compared to currently available general computer systems that do not have resource access controller 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

As used herein, a user access context is any situation, circumstance, setting, or the like that corresponds to a user who is requesting access to a protected resource. A user access context may be, for example, "user is at home", "user is at work", "user is alone", "user is not alone", "user is author of requested document", or the like. An access policy defines the user access context needed by the user to access a particular protected resource. A specific example of a user access context-based access control policy may be "document A can only be accessed by an authorized user who is alone and has administrative privilege from home."

Illustrative embodiments automatically generate and implement appropriate access control policies corresponding to protected resources. Illustrative embodiments utilize an access policy generator, which utilizes machine learning, to automatically generate and implement user access context-based access control policies to control access to protected resources. The access policy generator of illustrative embodiments can automatically generate an appropriate user access context-based policy for any protected resource. The access policy generator includes, for example: a resource attribute extractor that identifies and extracts a set of attributes corresponding to a requested resource; a user access context generator that generates a needed user access context for a requested resource using a trained machine learning model; an access policy validator that determines the validity of generated access policy candidates; and an access policy selector that selects the most appropriate (e.g., most secure) access policy for a particular requested resource. As a result, illustrative embodiments increase performance of a computer to protect the resources using the trained machine learning model to automatically generate and implement access policies with needed user access contexts.

An attribute of a protected resource is any element, feature, characteristic, trait, property, or the like that describes a particular protected resource. For example, a resource attribute may be a name or identifier of a protected resource, date when the protected resource was created or placed in service, author of the protected resource, location where the protected resource was created, permitted types of access to the protected resource, and the like. The user access context generator is a trained machine learning model, which can include a set of binary classifiers, based on collected training data. In addition, the access policy generator may utilize a low-dimensional vector generator (e.g., word-to-vector (word2vec) model) or other possible implementations to extract resource attributes or identify similar access control policies as potential candidates. Illustrative embodiments can utilize a defined maximum policy distance threshold to enable quantitative control over security and convenience of resource access control policy candidates that may be similar to generated access control policies.

Illustrative embodiments collect the training data for the user access context generator from a plurality of trusted (e.g., authorized) users. For example, illustrative embodiments limit protected resource access to trusted users when the system is initialized and running for the first time. Illustrative embodiments allow the trusted users to randomly access protected resources using various and varied user access contexts. Illustrative embodiments record the various user access contexts of the trusted users upon requesting access to the different protected resources and also record attributes corresponding to each of the requested resources. Illustrative embodiments utilize the recorded user access contexts and recorded resource attributes as training data for the machine learning model of the user access context generator.

Thus, illustrative embodiments are capable of generating and implementing flexible resource access control policies by taking into account user access contexts in natural language using machine learning. As a result, illustrative embodiments provide one or more technical solutions that overcome a technical problem with automatically generating and implementing policies for resource access control. Consequently, these one or more technical solutions provide a technical effect and practical application in the field of resource access control by increasing security of resources utilizing user access contexts needed by users when requesting access to the resources.

Figure 3:
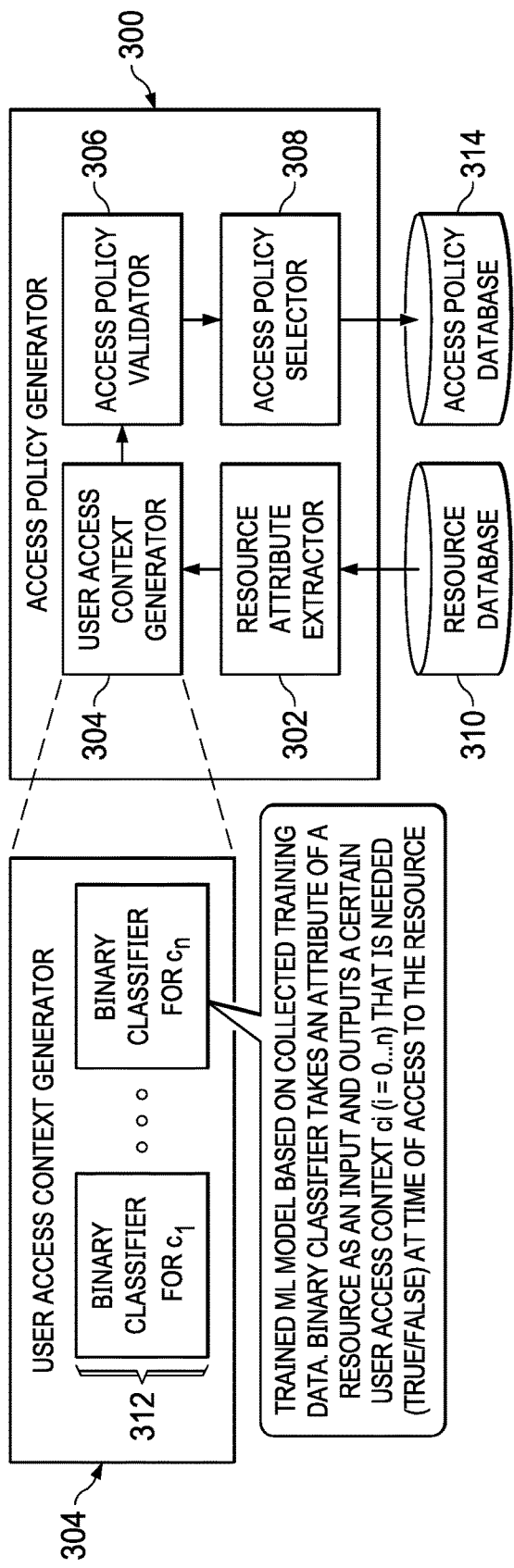
FIG. 3 is a diagram illustrating an example of an access policy generator in accordance with an illustrative embodiment.

With reference now to FIG. 3, a diagram illustrating an example of an access policy generator is depicted in accordance with an illustrative embodiment. Access policy generator 300 may be implemented in a computer, such as, for example, server 104 in FIG. 1 or a data processing system 200 in FIG. 2. Access policy generator 300 automatically generates resource access control policies with needed user access contexts for accessing protected resources.

In this example, access policy generator 300 includes resource attribute extractor 302, user access context generator 304, access policy validator 306, and access policy selector 308. Access policy generator 300 utilizes resource attribute extractor 302 to extract a set of attributes corresponding to respective resources protected by the computer. Resource attribute extractor 302 extract the attributes of resources from resource database 310. Resource database 310 stores profiles corresponding to each of the resources protected by the computer. A resource profile may include, for example, identifier (e.g., name) of a resource, date when the resource was created or placed in service, location where the protected resource was created or placed in service, permitted types of access to the resource, and the like.

Access policy generator 300 utilizes user access context generator 304 to automatically generate a needed user access context or a set of needed user access contexts for a requested resource. User access context generator 304 includes a trained machine learning model comprised of set of binary classifiers 312. The trained machine learning model is based on collected training data from a group of trusted users accessing the resources using various user access contexts. Each binary classifier in set of binary classifiers 312 takes an attribute of a requested resource as an input and outputs a certain user access context that is needed (true or false) at time of access to the resource.

Access policy generator 300 utilizes access policy validator 306 to determine whether a generated access policy candidate is valid or not for a particular requested resource. For example, if access policy validator 306 determines that a particular access policy candidate is incompatible with one or more other access policies for that particular resource, then access policy validator 306 deletes or removes that particular access policy as a possible candidate for that particular resource. Access policy generator 300 utilizes access policy selector 308 to select the most appropriate access policy candidate for that particular resource if multiple access policy candidates exist for that particular resource. After selecting the most appropriate access policy candidate for that particular resource, access policy selector 308 stores the selected access policy for that particular resource in access policy database 314. Access policy database 314 stores all of the generated access policies for the resources protected by the computer.

Figure 4:
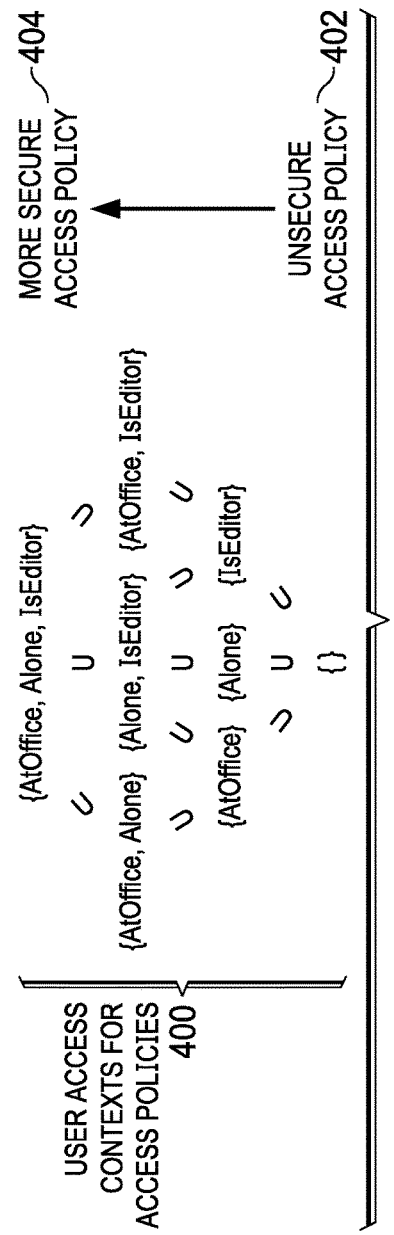
FIG. 4 is a diagram illustrating an example of user access contexts for access control policies in accordance with an illustrative embodiment.

With reference now to FIG. 4, a diagram illustrating an example of user access contexts for access control policies is depicted in accordance with an illustrative embodiment. User access contexts for access control policies 400 may be implemented in a user access context generator, such as, for example, user access context generator 304 in FIG. 3.

In this example, user access contexts for access control policies 400 range from unsecure access policy 402 to more secure access policy 404. Unsecure access policy 402 is represented by an empty set of user access contexts (e.g., "{ }"), while more secure access policy 404 is represented by a combination of user access contexts (e.g., "{AtOffice, Alone, IsEditor}"), for accessing a particular resource. In other words, an access policy that does not include a user access context is least secure or most dangerous and an access policy that includes all user access contexts is most secure or least dangerous.

As used herein, the term "context" means a countable atomic context, such as, for example, "{AtOffice}", "{Alone}", or "{IsEditor}", which is provided by a system administrator who manages the context-based access control system of illustrative embodiments. The term "contexts" means a combination of contexts, such as, for example, "{AtOffice, Alone}, {Alone, IsEditor}, and {AtOffice, IsEditor}". Thus, formats of resulting access policies may be different.

For example, illustrative embodiments utilizing most secure access policy selection, a context may be, for example, {AtOffice, Alone}. In other words, illustrative embodiments utilizing most secure access policy selection, a user should be at the user's office and alone at time of resource access request to satisfy that particular access policy. Alternatively, illustrative embodiments utilizing disjunct access policy selection, a combination of contexts may be, for example, {{AtOffice, Alone}, {Alone, IsEditor}}. In other words, illustrative embodiments utilizing disjunct access policy selection, a user should either be at the user's office and alone, or alone and an editor, at time of resource access request to satisfy that particular access policy. Therefore, illustrative embodiments utilizing disjunct access policy selection allows a user to have a disjunction of user access contexts when multiple access policy candidates exist having the same level of security, while illustrative embodiments utilizing most secure access policy selection just strictly outputs the safest access policy every time. For example, illustrative embodiments utilizing most secure access policy selection, if there are multiple access policy candidates, such as, for example, access policy candidates "A" and "B", for a particular resource, then illustrative embodiments select access policy candidate "A" for that particular resource when illustrative embodiments determine that access policy candidate "A" is the more secure access policy.

Figure 5:
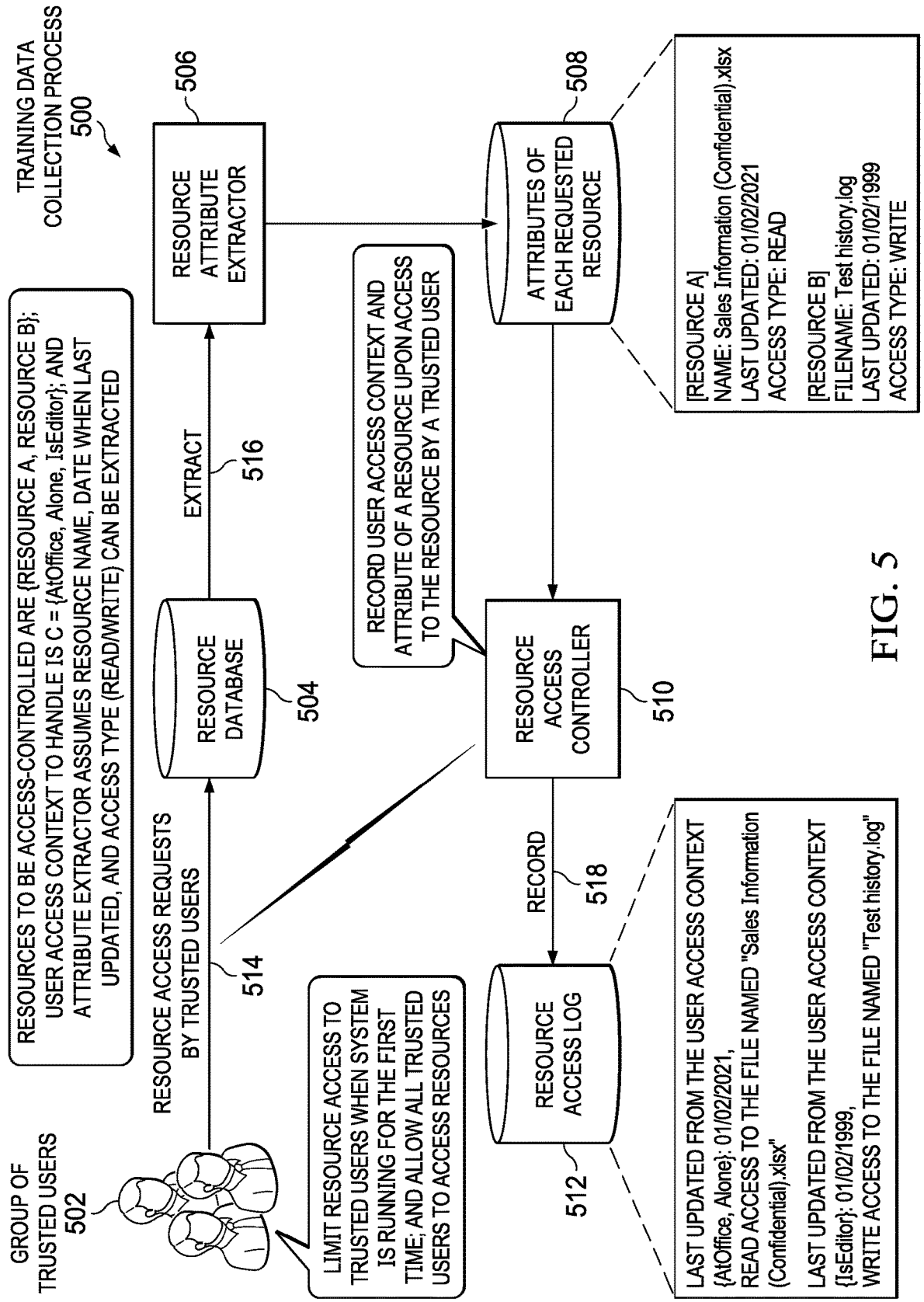
FIG. 5 is a diagram illustrating an example of a training data collection process in accordance with an illustrative embodiment.

With reference now to FIG. 5, a diagram illustrating an example of a training data collection process is depicted in accordance with an illustrative embodiment. Training data collection process 500 may be implemented in a computer, such as, for example, server 104 in FIG. 1 or a data processing system 200 in FIG. 2.

In this example, training data collection process 500 includes group of trusted users 502, resource database 504, resource attribute extractor 506, attributes of each requested resource 508, resource access controller 510, and resource access log 512. Group of trusted users 502 represents a plurality of users who are authorized to access resources, such as, for example, resource 110 in FIG. 1, which are protected by the computer. Resource database 504 and resource attribute extractor 506 may be, for example, resource database 310 and resource attribute extractor 302 in FIG. 3. Resource access controller 510 may be, for example, resource access controller 218 in FIG. 2. Resource access log 512 represents a log, record, or summary of each accessed resource that is protected by the computer.

In this example, resources to be access-controlled by the computer are "{Resource A, Resource B}"; user access context to handle is "{AtOffice, Alone, IsEditor}"; and resource attribute extractor 506 assumes resource name, date when last updated, and access type (e.g., read/write) can be extracted from profiles corresponding to Resource A and Resource B. Also, the computer limits resource access to group of trusted users 502 when the computer is running for the first time and allows all trusted users of group of trusted users 502 to access resources protected by the computer using various user access contexts.

At 514, resource database 504 receives resource access requests from group of trusted users 502. At 516, resource attribute extractor 506 extracts attributes of the resources (e.g., Resource A and Resource B) requested by group of trusted users 502. Attributes of each requested resource 508 represent the extracted attributes of the resources requested by group of trusted users 502. Attributes of each requested resource 508 show attributes of Resource A to include: "Name: Sales Information (Confidential).xlsx; Last Updated: Jan. 2, 2021; and Access Type: Read." In addition, attributes of each requested resource 508 show attributes of Resource B to include: "Filename: Test History.log; Last updated: Jan. 2, 1999; and Access Type: Write."

At 518, resource access controller 510 records user access context of each respective user resource access request by group of trusted users 502 and the attributes of each requested resource in resource access log 512 upon access to the resources by group of trusted users 502. In this example, resource access controller 510 records in resource access log 512 "Last updated from the user access context {AtOffice, Alone}: Jan. 2, 2021, read access for file named 'Sales Information (Confidential).xlsx'" for Resource A and "Last updated from the user access context {IsEditor}: Jan. 2, 1999, write access for file named "Test History.log" for Resource B.

Figure 6:
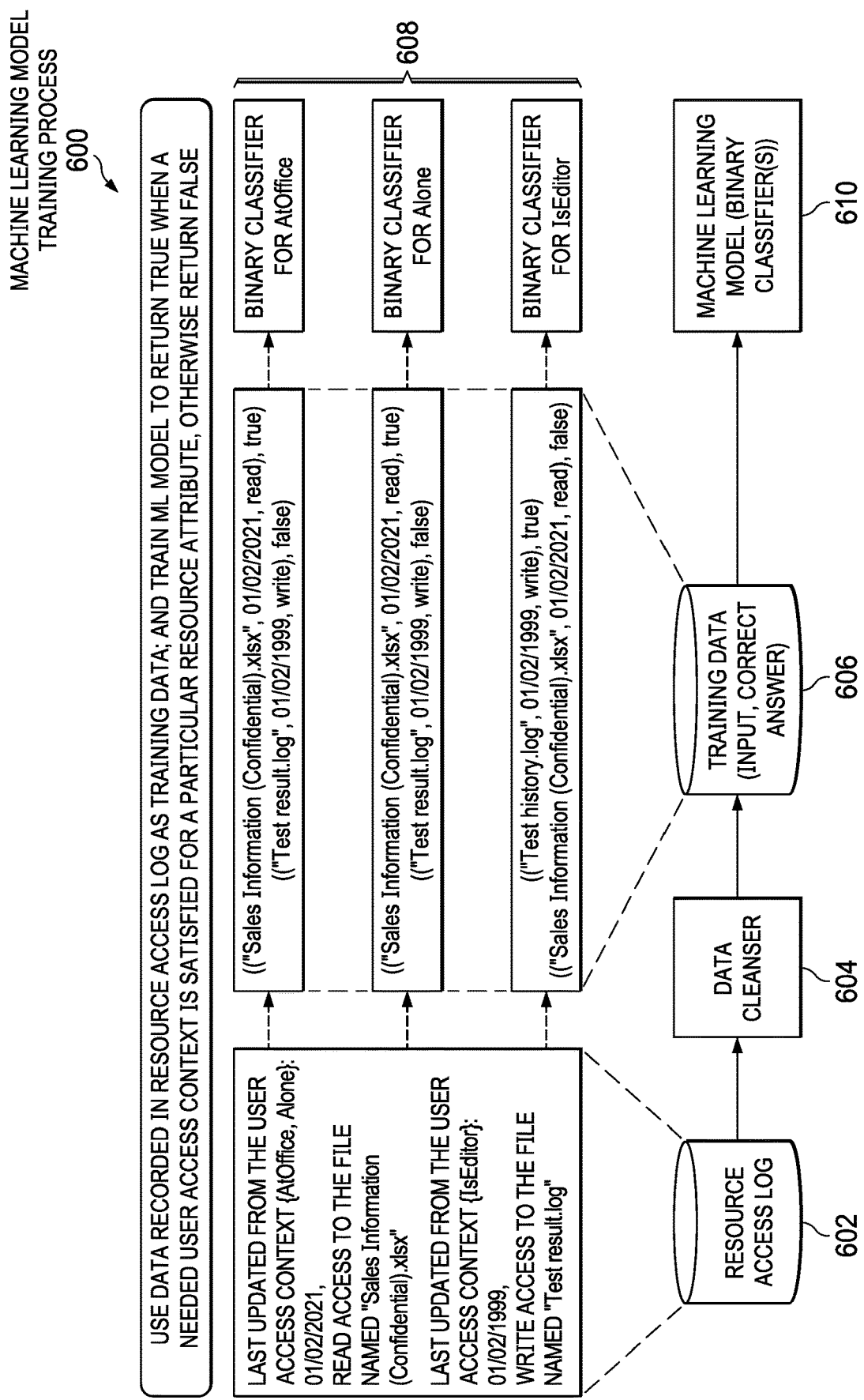
FIG. 6 is a diagram illustrating an example of a machine learning model training process in accordance with an illustrative embodiment.

With reference now to FIG. 6, a diagram illustrating an example of a machine learning model training process is depicted in accordance with an illustrative embodiment. Machine learning model training process 600 may be implemented in a computer, such as, for example, server 104 in FIG. 1 or a data processing system 200 in FIG. 2.

In this example, machine learning model training process 600 includes resource access log 602, such as, for example, resource access log 512 in FIG. 5. The computer uses data recorded in resource access log 602 as training data (e.g., training data 606). In this example, the data recorded in resource access log 602 includes "Last updated from the user access context {AtOffice, Alone}: Jan. 2, 2021, read access for file named 'Sales Information (Confidential).xlsx'" and "Last updated from the user access context {IsEditor}: Jan. 2, 1999, write access for file named "Test History.log" similar to the example shown in FIG. 5. Machine learning model training process 600 utilizes data cleanser 604 to perform data cleansing of the recorded data. Data cleansing or data cleaning is the process of detecting and correcting, or removing, corrupt or inaccurate data from a database, record, file, or the like and refers to identifying incomplete, incorrect, inaccurate, or irrelevant parts of the data and then replacing, modifying, or deleting the corrupt or coarse data.

Machine learning model training process 600 inputs training data 606, along with correct answers, into binary classifiers 608 of machine learning model 610. Machine learning model training process 600 inputs "(('Sales Information (Confidential).xlsx', Jan. 2, 2021, read), true)"; and "(('Test Result.log', Jan. 2, 1999, write), false)" of training data 606 into binary classifier for "AtOffice" user access context. Machine learning model training process 600 also inputs "(('Sales Information (Confidential).xlsx', Jan. 2, 2021, read), true)"; and "(('Test Result.log', Jan. 2, 1999, write), false)" of training data 606 into binary classifier for "Alone" user access context. In addition, machine learning model training process 600 inputs "(('Test Result.log', Jan. 2, 1999, write), true)" and "(('Sales Information (Confidential).xlsx', Jan. 2, 2021, read), false)" of training data 606 into binary classifier for "IsEditor" user access context. As a result, machine learning model training process 600 trains machine learning model 610 to return "true" when a needed user access context is satisfied for a particular resource attribute, otherwise machine learning model 610 to returns "false" when a needed user access context is not satisfied for a particular resource attribute.

Figure 7:
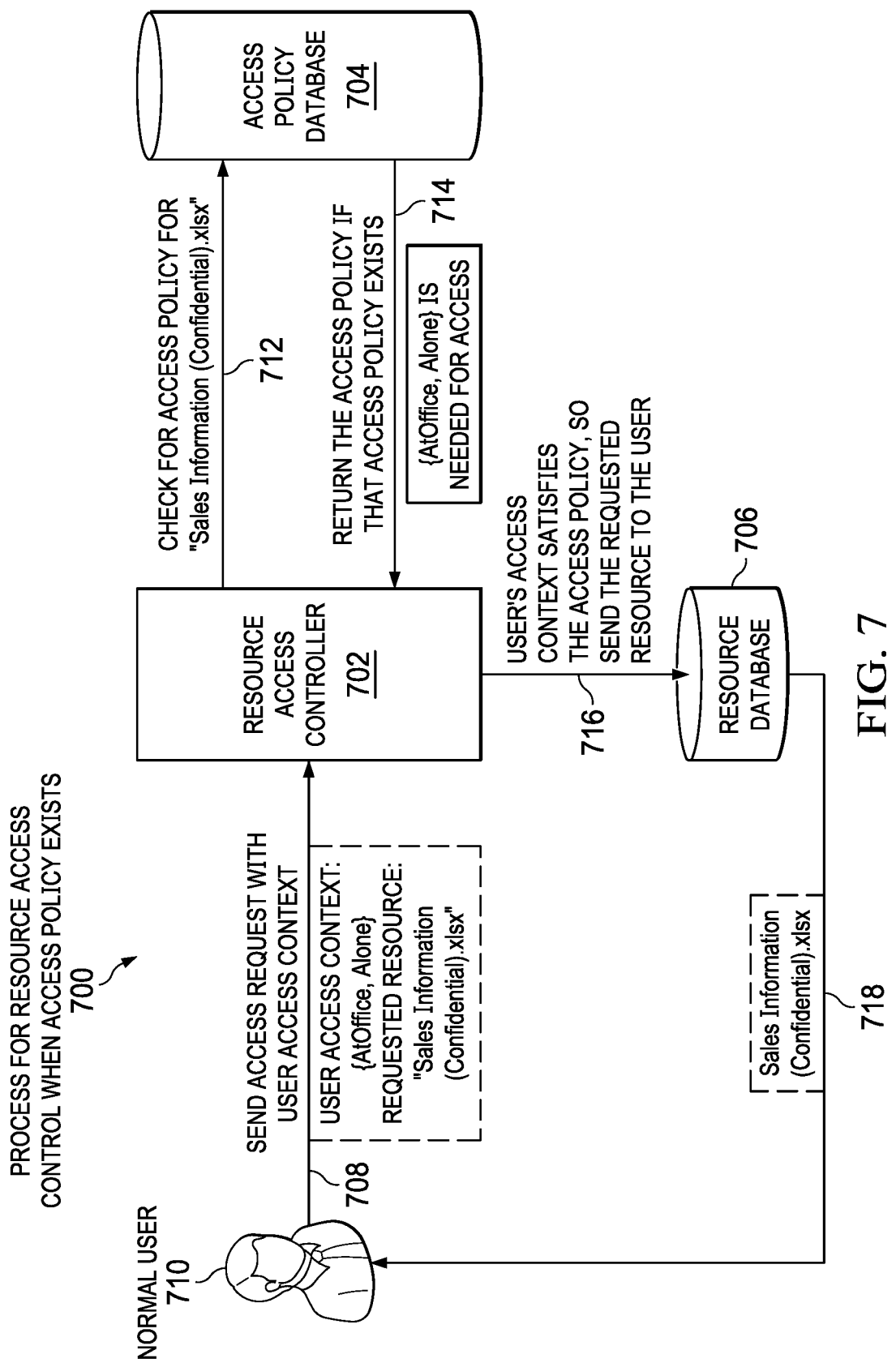
FIG. 7 is a diagram illustrating an example of a process for resource access control when access policy exists in accordance with an illustrative embodiment.

With reference now to FIG. 7, a diagram illustrating an example of a process for resource access control when access policy exists is depicted in accordance with an illustrative embodiment. Process for resource access control when access policy exists 700 may be implemented in a computer, such as, for example, server 104 in FIG. 1 or a data processing system 200 in FIG. 2.

In this example, process for resource access control when access policy exists 700 includes resource access controller 702, such as, for example, resource access controller 218 in FIG. 2 or resource access controller 510 in FIG. 5, access policy database 704, such as, for example, access policy database 314 in FIG. 3, and resource database 706, such as, for example, resource database 310 in FIG. 3 or resource database 504 in FIG. 5. At 708, normal user 710 sends a resource access request with a user access context (e.g., User Access Context: {AtOffice, Alone} for Requested Resource: "Sales Information (Confidential).xlsx) to resource access controller 702. Normal user 710 represents any type of user requesting access to a resource protected by the computer.

At 712, resource access controller 702 checks access policy database 704 for an access policy corresponding to requested resource "Sales Information (Confidential).xlsx". At 714, access policy database 704 returns the access policy (e.g., {AtOffice, Alone} is the needed user access context for accessing the requested resource "Sales Information (Confidential).xlsx"). At 716, resource access controller 702 determines that the user access context {AtOffice, Alone} of normal user 710 when requesting access to resource "Sales Information (Confidential).xlsx" satisfies the access policy for resource "Sales Information (Confidential).xlsx" with the needed user access context of {AtOffice, Alone}. As a result, at 718, resource access controller 702 directs resource database 706 to send the requested resource "Sales Information (Confidential).xlsx" to normal user 710.

Figure 8:
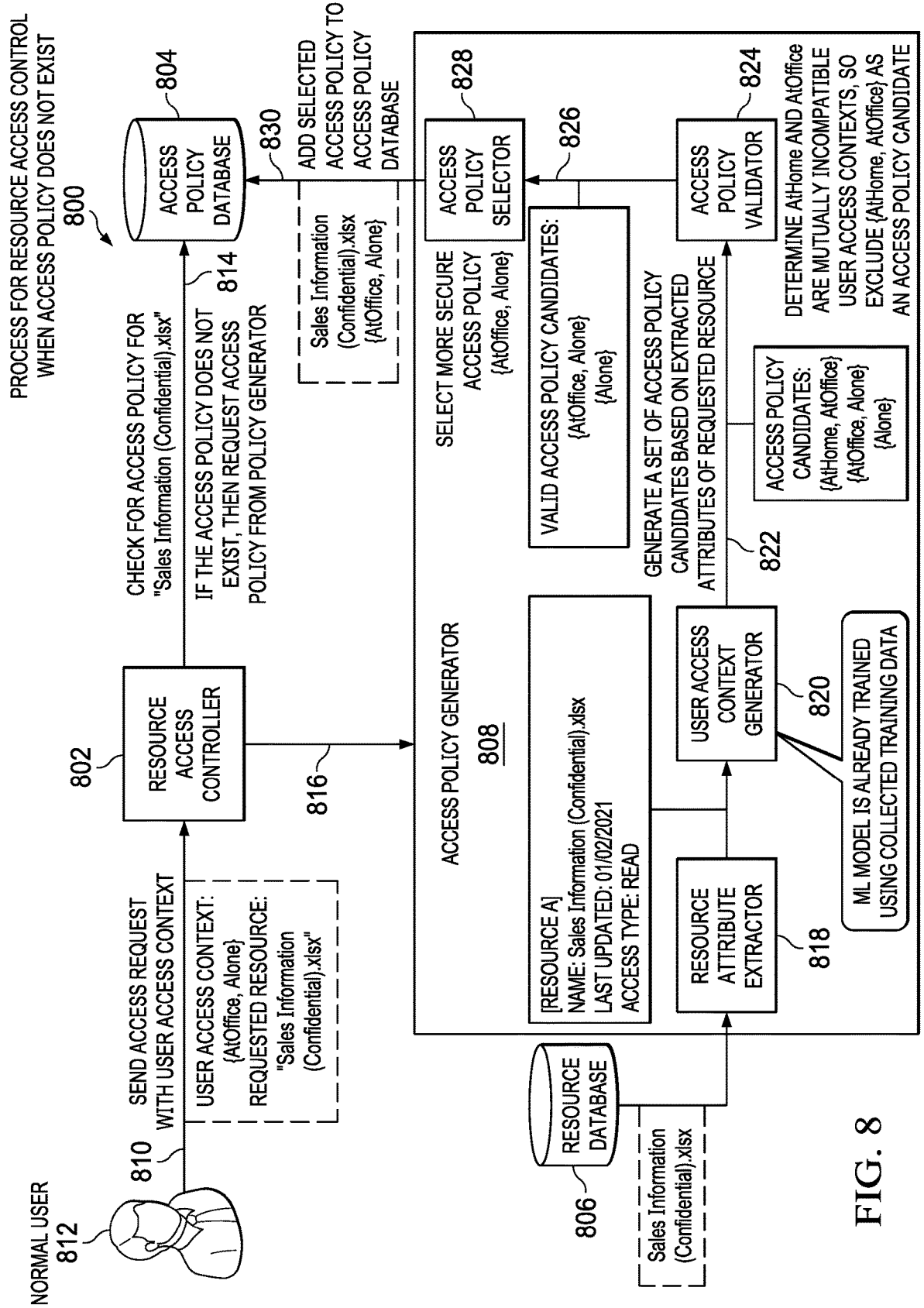
FIG. 8 is a diagram illustrating an example of a process for resource access control when access policy does not exist in accordance with an illustrative embodiment.

With reference now to FIG. 8, a diagram illustrating an example of a process for resource access control when access policy does not exist is depicted in accordance with an illustrative embodiment. Process for resource access control when access policy does not exist 800 may be implemented in a computer, such as, for example, server 104 in FIG. 1 or a data processing system 200 in FIG. 2.

In this example, process for resource access control when access policy does not exist 800 includes resource access controller 802, access policy database 804, resource database 806, and access policy generator 808. Resource access controller 802, access policy database 804, and resource database 806 may be, for example, resource access controller 702, access policy database 704, and resource database 706 in FIG. 7. Access policy generator 808 may be, for example, access policy generator 300 in FIG. 3.

At 810, normal user 812 sends a resource access request with a user access context (e.g., User Access Context: {AtOffice, Alone} for Requested Resource: "Sales Information (Confidential).xlsx) to resource access controller 802. At 814, resource access controller 802 checks access policy database 804 for an access policy corresponding to resource "Sales Information (Confidential).xlsx". Resource access controller 802 determines that an access policy corresponding to requested resource "Sales Information (Confidential).xlsx" does not exist in access policy database 804 during the search. As a result, at 816, resource access controller 802 instructs access policy generator 808 to generate the access policy for the requested resource "Sales Information (Confidential).xlsx".

Access policy generator 808 utilizes resource attribute extractor 818 to extract a set of attributes corresponding to the requested resource "Sales Information (Confidential).xlsx" from resource database 806. Resource attribute extractor 818 then inputs the set of extracted attributes (e.g., [Resource A]; Name: Sales Information (Confidential).xlsx; Last Updated: Jan. 2, 2021; Access Type: Read) into user access context generator 820. It should be noted that user access context generator 820 includes a machine learning model, such as, for example, machine learning model 610 in FIG. 6, which is already trained using collected training data from a group of trusted users.

At 822, user access context generator 820 generates a set of access policy candidates (e.g., Access Policy Candidate A with needed user access context {AtHome, AtOffice}, Access Policy Candidate B with needed user access context {AtOffice, Alone}; and Access Policy Candidate C with needed user access context {Alone}) for the requested resource "Sales Information (Confidential).xlsx" based on the extracted set of attributes of the requested resource. User access context generator 820 then inputs the set of access policy candidates for the requested resource "Sales Information (Confidential).xlsx" into access policy validator 824.

Access policy validator 824 determines that the user access contexts of {AtHome, AtOffice} corresponding to Access Policy Candidate A are mutually incompatible. As a result, access policy validator 824 excludes Access Policy Candidate A with needed user access context {AtHome, AtOffice} as an access policy candidate. At 826, access policy validator 824 sends the remaining valid access policy candidates (e.g., Policy Candidate B with needed user access context {AtOffice, Alone} and Access Policy Candidate C with needed user access context {Alone}) to access policy selector 828.

Access policy selector 828 selects the more secure access policy (e.g., Policy Candidate B with needed user access context {AtOffice, Alone}) for the requested resource "Sales Information (Confidential).xlsx" based on a most secure access policy selection process. At 830, access policy selector 828 adds the selected more secure access policy (e.g., Policy Candidate B with needed user access context {AtOffice, Alone}) for the requested resource "Sales Information (Confidential).xlsx" to access policy database 804.

Figure 9:
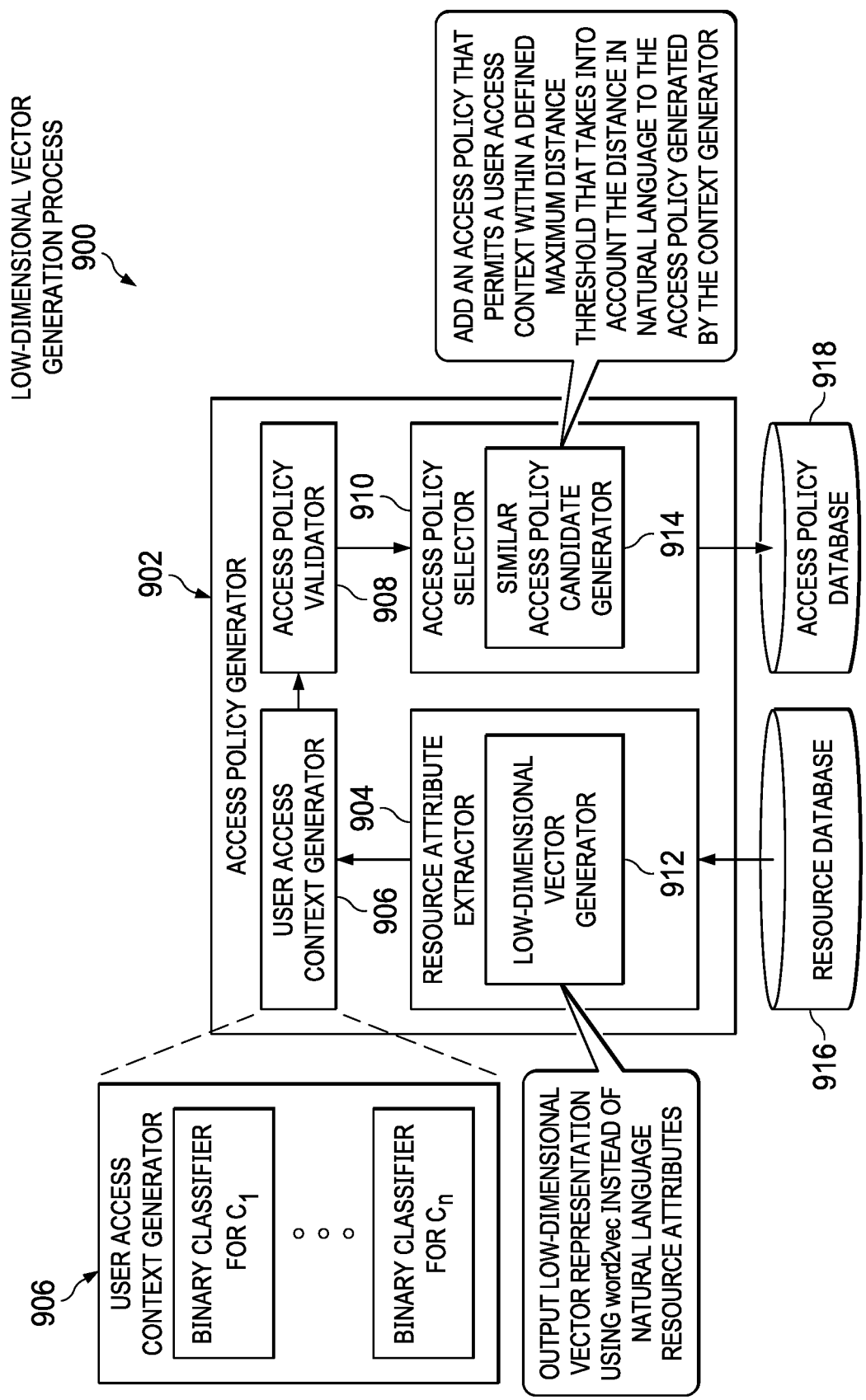
FIG. 9 is a diagram illustrating an example of a low-dimensional vector generation process in accordance with an illustrative embodiment.

With reference now to FIG. 9, a diagram illustrating an example of a low-dimensional vector generation process is depicted in accordance with an illustrative embodiment. Low-dimensional vector generation process 900 may be implemented in a computer, such as, for example, server 104 in FIG. 1 or a data processing system 200 in FIG. 2.

In this example, low-dimensional vector generation process 900 includes access policy generator 902. Access policy generator 902 is similar to access policy generator 300 in FIG. 3 and access policy generator 808 in FIG. 8. For example, access policy generator 902 includes resource attribute extractor 904, user access context generator 906, access policy validator 908, and access policy selector 910. However, resource attribute extractor 904 includes low-dimensional vector generator 912 and access policy selector 910 includes similar access policy candidate generator 914.

Figure 10:
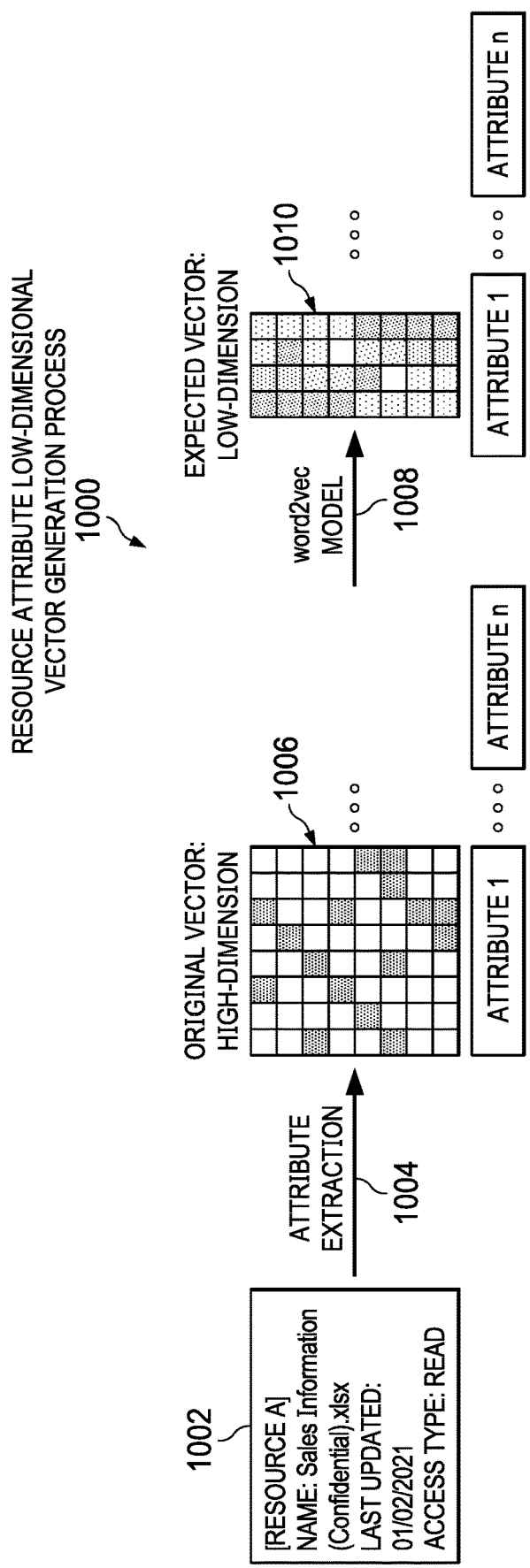
FIG. 10 is a diagram illustrating an example of a resource attribute low-dimensional vector generation process in accordance with an illustrative embodiment.

Low-dimensional vector generator 912 outputs a low-dimensional vector representation using a word-to-vector (word2vec) model, instead of a natural language representation, of attributes corresponding to the requested resource extracted from resource database 916 (See the example of FIG. 10). Similar access policy candidate generator 914 generates a similar access policy candidate that permits a user access context within a defined maximum distance threshold that takes into account the distance in natural language of the access policy generated by user access context generator 906 (See the example of FIG. 11).

With reference now to FIG. 10, a diagram illustrating an example of a resource attribute low-dimensional vector generation process is depicted in accordance with an illustrative embodiment. Resource attribute low-dimensional vector generation process 1000 may be implemented in a computer, such as, for example, server 104 in FIG. 1 or a data processing system 200 in FIG. 2.

In this example, resource attribute low-dimensional vector generation process 1000 includes requested resource 1002 (e.g., [Resource A]). At 1004, resource attribute low-dimensional vector generation process 1000 utilizes a resource attribute extractor, such as, for example, resource attribute extractor 904 in FIG. 9, to extract a set of attributes corresponding to requested Resource A (e.g., Name: Sales Information (Confidential).xlsx; Last Updated Jan. 2, 2021; and Access Type: Read) from a resource database, such as, for example, resource database 916 in FIG. 9.

Resource attribute low-dimensional vector generation process 1000 generates original high-dimension vector 1006 for the set of attributes corresponding to the requested resource. Then, resource attribute low-dimensional vector generation process 1000 utilizes word2vec model 1008 of a low-dimensional vector generator, such as, for example, low-dimensional vector generator 912 in FIG. 9, to generate expected low-dimension vector 1010 for the set of attributes corresponding to the requested resource.

Figure 11:
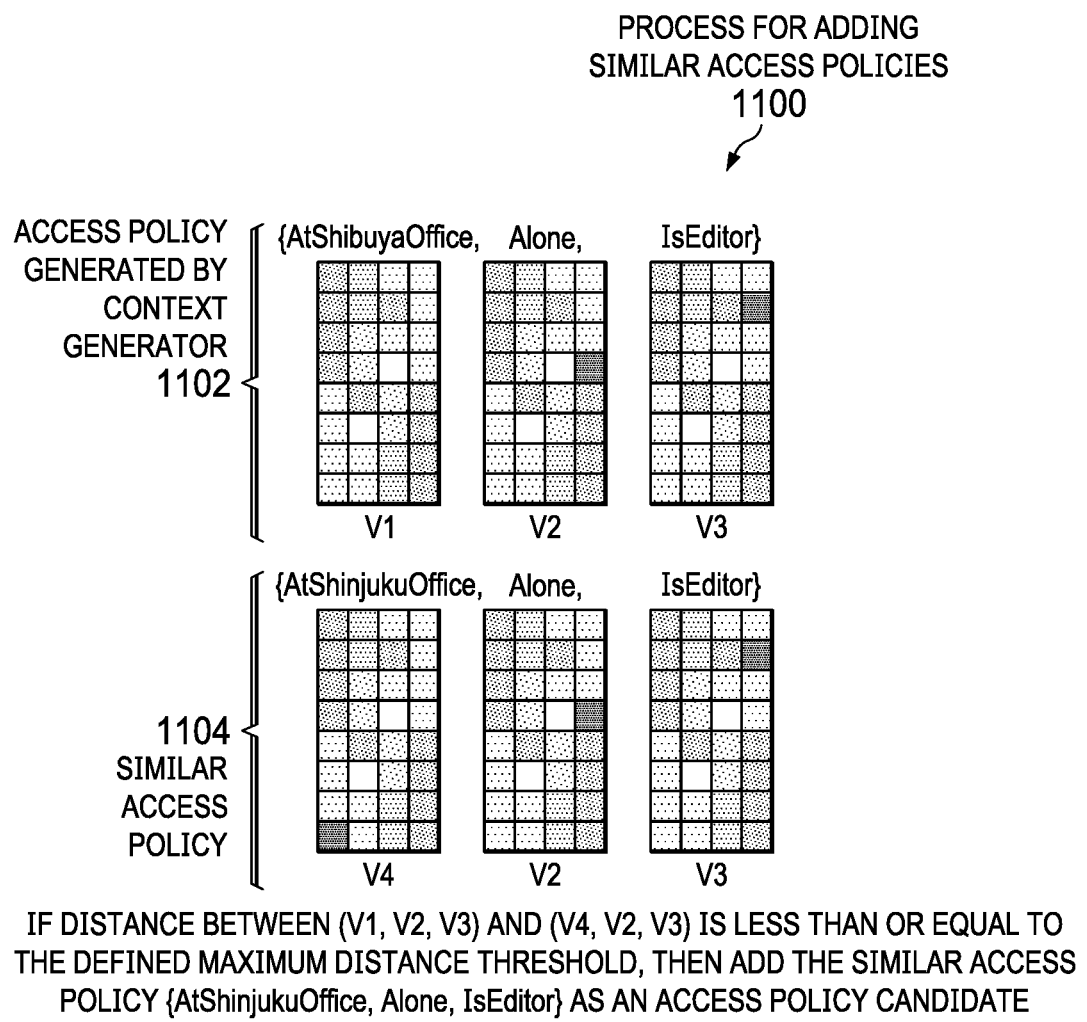
FIG. 11 is a diagram illustrating an example of a process for adding similar access policies in accordance with an illustrative embodiment.

With reference now to FIG. 11, a diagram illustrating an example of a process for adding similar access policies is depicted in accordance with an illustrative embodiment. Process for adding similar access policies 1100 may be implemented in a computer, such as, for example, server 104 in FIG. 1 or a data processing system 200 in FIG. 2.

In this example, process for adding similar access policies 1100 includes access policy 1102 (e.g., access policy with the needed user access context {AtShibuyaOffice, Alone, IsEditor}), which is generated by a user access context generator, such as, for example, user access context generator 906 in FIG. 9. The needed user access context AtShibuyaOffice, Alone, and IsEditor is represented by vectors V1, V2, and V3, respectively. Process for adding similar access policies 1100 includes similar access policy 1104 (e.g., access policy with the needed user access context {AtShinjukuOffice, Alone, IsEditor}), which is generated by a similar access policy candidate generator, such as, for example, similar access policy candidate generator 914 in FIG. 9. The needed user access context AtShinjukuOffice, Alone, and IsEditor is represented by vectors V4, V2, and V3, respectively. If the distance between V1, V2, V3 of access policy 1102 and V4, V2, V3 of similar access policy 1104 is less than or equal to a defined maximum distance threshold, then process for adding similar access policies 1100 adds similar access policy 1104 with the needed user access context {AtShinjukuOffice, Alone, IsEditor} as an access policy to an access policy database, such as, for example, access policy database 918 in FIG. 9.

Figure 12:
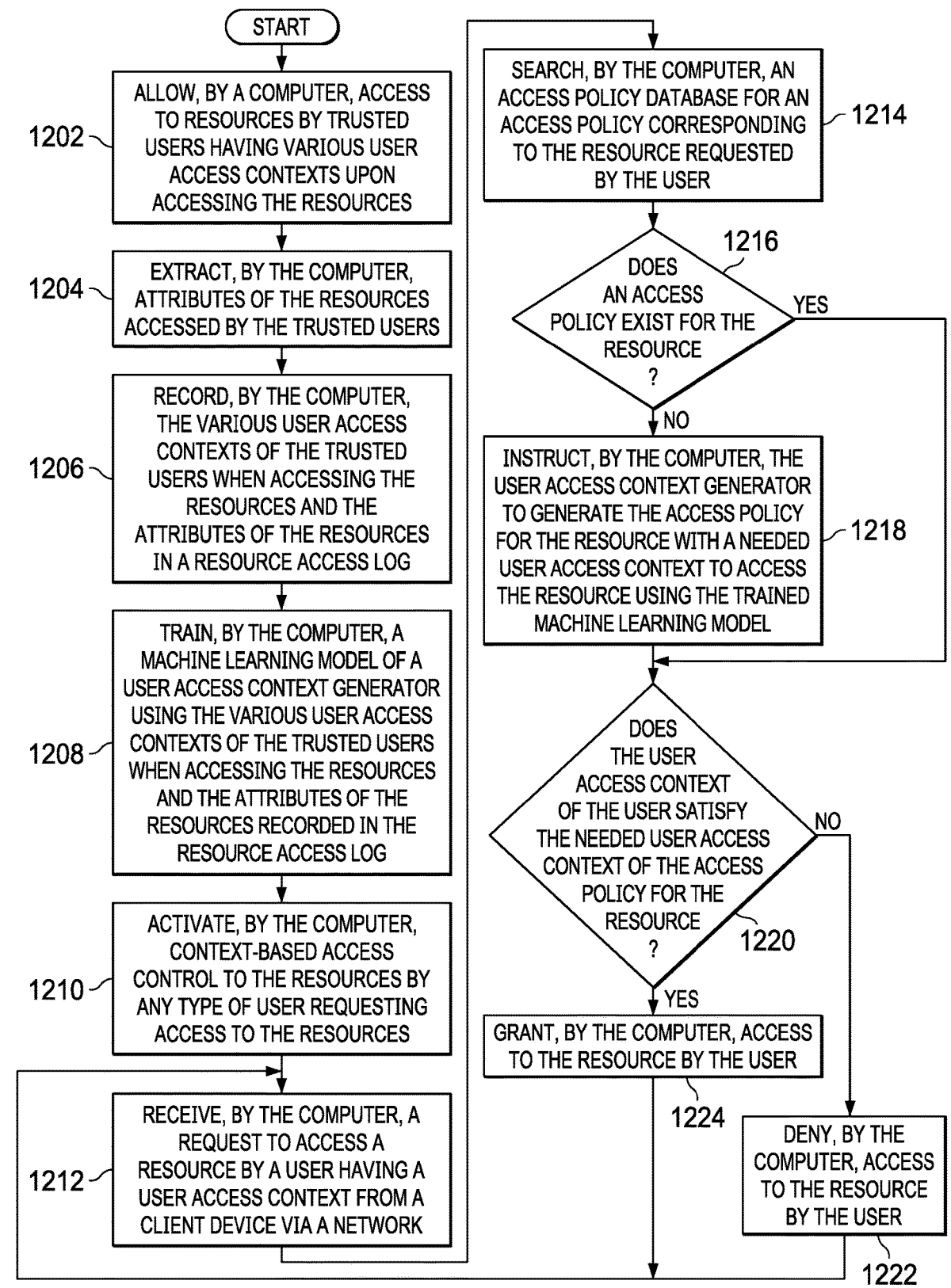
FIG. 12 is a flowchart illustrating a process for controlling access to a protected resource in accordance with an illustrative embodiment.

With reference now to FIG. 12, a flowchart illustrating a process for controlling access to a protected resource is shown in accordance with an illustrative embodiment. The process shown in FIG. 12 may be implemented in a computer, such as, for example, server 104 in FIG. 1 or data processing system 200 in FIG. 2.

The process begins when the computer allows access to resources by trusted users having various user access contexts upon accessing the resources (step 1202). The resources are protected by the computer. The computer extracts attributes of the resources accessed by the trusted users (step 1204). The computer records the various user access contexts of the trusted users when accessing the resources and the attributes of the resources in a resource access log (step 1206). The computer trains a machine learning model of a user access context generator using the various user access contexts of the trusted users when accessing the resources and the attributes of the resources recorded in the resource access log (step 1208).

The computer activates context-based access control to the resources by any type of user requesting access to the resources (step 1210). The computer receives a request to access a resource by a user having a user access context from a client device via a network (step 1212). The computer searches an access policy database for an access policy corresponding to the resource requested by the user (step 1214).

The computer makes a determination as to whether an access policy exists for the resource in the access policy database based on the search (step 1216). If the computer determines that an access policy does not exist for the resource in the access policy database, no output of step 1216, then the computer instructs the user access context generator to generate the access policy for the resource with a needed user access context to access the resource using the trained machine learning model (step 1218). Thereafter, the process proceeds to step 1220. If the computer determines that an access policy does exist for the resource in the access policy database, yes output of step 1216, then the computer makes a determination as to whether the user access context of the user satisfies the needed user access context of the access policy for the resource (step 1220). If the computer determines that the user access context of the user does not satisfy the needed user access context of the access policy for the resource, no output of step 1220, then the computer denies access to the resource by the user (step 1222). Thereafter, the process returns to step 1212 where the computer waits to receive another resource access request. If the computer determines that the user access context of the user does satisfy the needed user access context of the access policy for the resource, yes output of step 1220, then the computer grants access to the resource by the user (step 1224). Thereafter, the process returns to step 1212 where the computer waits to receive another resource access request.

Figure 13:
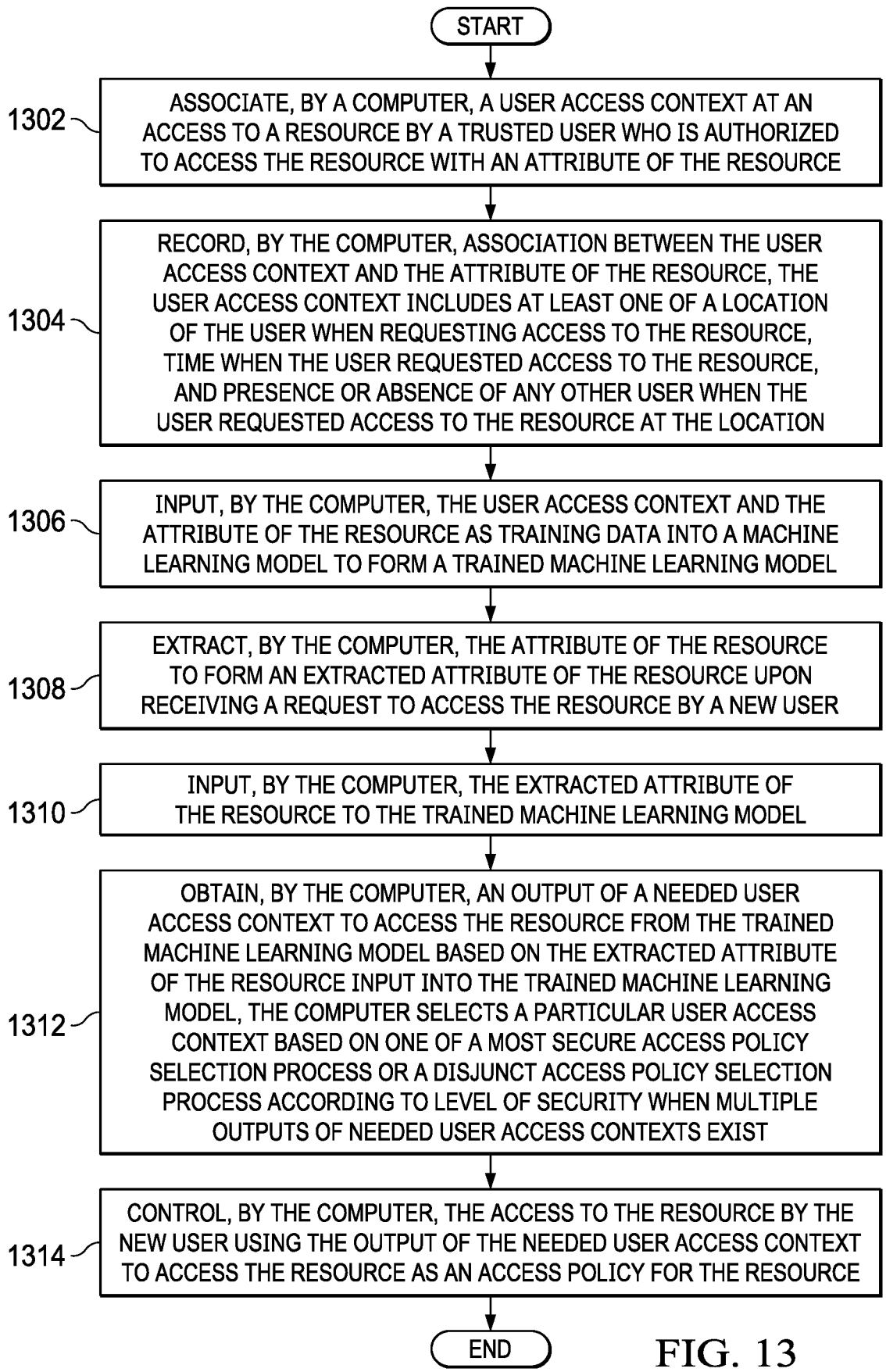
FIG. 13 is a flowchart illustrating a process for automatically generating and implementing access policies in accordance with an illustrative embodiment.

With reference now to FIG. 13, a flowchart illustrating a process for automatically generating and implementing access control policies is shown in accordance with an illustrative embodiment. The process shown in FIG. 13 may be implemented in a computer, such as, for example, server 104 in FIG. 1 or data processing system 200 in FIG. 2.

The process begins when the computer associates a user access context at an access to a resource by a trusted user who is authorized to access the resource with an attribute of the resource (step 1302). The computer records the association between the user access context and the attribute of the resource (step 1304). The user access context includes at least one of a location of the user when requesting access to the resource, time when the user requested access to the resource, and presence or absence of any other user when the user requested access to the resource at the location. The computer inputs the user access context and the attribute of the resource as training data into a machine learning model to form a trained machine learning model (step 1306).

The computer extracts the attribute of the resource to form an extracted attribute of the resource upon receiving a request to access the resource by a new user (step 1308). The computer inputs the extracted attribute of the resource to the trained machine learning model (step 1310). The computer obtains an output of a needed user access context to access the resource from the trained machine learning model based on the extracted attribute of the resource input into the trained machine learning model (step 1312). The computer selects a particular user access context based on one of a most secure access policy selection process or a disjunct access policy selection process according to level or degree of security when multiple outputs of needed user access contexts exist. The computer controls the access to the resource by the new user using the output of the needed user access context to access the resource as an access policy for the resource (step 1314). Thereafter, the process terminates.

Thus, illustrative embodiments of the present invention provide a computer-implemented method, computer system, and computer program product for automatically generating and implementing access policies for context-based access control to protected resources. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically generating and implementing access policies, the computer-implemented method comprising:
   obtaining, by a computer, an output of a needed user access context to access a resource from a trained machine learning model based on an extracted attribute of the resource input into the trained machine learning model; and
   controlling, by the computer, the access to the resource by a user using the output of the needed user access context to access the resource as an access policy for the resource, wherein the computer selects a particular combination of user access contexts as the access policy for the resource based on one of a most secure access policy selection process and a disjunct access policy selection process according to a level of security when multiple outputs of different combinations of needed user access contexts exist, and wherein a user access context includes absence of any other user when the user requested access to the resource at a location.

2. The computer-implemented method of claim 1 further comprising:
   extracting, by the computer, an attribute of the resource to form the extracted attribute of the resource upon receiving a request to access the resource by the user; and
   inputting, by the computer, the extracted attribute of the resource to the trained machine learning model.

3. The computer-implemented method of claim 1 further comprising:
   associating, by the computer, a user access context at an access to the resource by a trusted user who is authorized to access the resource with the attribute of the resource;
   recording, by the computer, association between the user access context and the attribute of the resource; and
   inputting, by the computer, the user access context and the attribute of the resource as training data into a machine learning model to form the trained machine learning model.

4. The computer-implemented method of claim 1 further comprising:
   allowing, by the computer, access to resources by trusted users having various user access contexts upon accessing the resources, wherein the resources are protected by the computer;
   extracting, by the computer, attributes of the resources accessed by the trusted users; and
   recording, by the computer, the various user access contexts of the trusted users when accessing the resources and the attributes of the resources in a resource access log.

5. The computer-implemented method of claim 4 further comprising:
training, by the computer, a machine learning model using the various user access contexts of the trusted users when accessing the resources and the attributes of the resources recorded in the resource access log; and
activating, by the computer, context-based access control to the resources by any user requesting access to the resources.

6. The computer-implemented method of claim 1 further comprising:
receiving, by the computer, a request to access the resource by the user having a user access context from a client device via a network; and
searching, by the computer, an access policy database for an access policy corresponding to the resource requested by the user.

7. The computer-implemented method of claim 6 further comprising:
determining, by the computer, whether the access policy exists for the resource in the access policy database based on the search; and
responsive to the computer determining that the access policy does not exist for the resource in the access policy database, instructing, by the computer, a user access context generator to generate the access policy for the resource with the needed user access context to access the resource using the trained machine learning model.

8. The computer-implemented method of claim 7 further comprising:
responsive to the computer determining that the access policy does exist for the resource in the access policy database, determining, by the computer, whether the user access context of the user satisfies the needed user access context of the access policy for the resource; and
responsive to the computer determining that the user access context of the user does not satisfy the needed user access context of the access policy for the resource, denying, by the computer, the access to the resource by the user.

9. The computer-implemented method of claim 8 further comprising:
responsive to the computer determining that the user access context of the user does satisfy the needed user access context of the access policy for the resource, granting, by the computer, the access to the resource by the user.

10. The computer-implemented method of claim 1 further comprising:
representing, by the computer, a particular combination of needed user access contexts corresponding to a particular access policy for the resource as a first plurality of vectors;
generating, by the computer, a similar access policy to the particular access policy for the resource having a similar combination of needed user access contexts to the combination of needed user access contexts corresponding to the particular access policy;
representing, by the computer, the similar combination of needed user access contexts as a second plurality of vectors;
determining, by the computer, a distance between the first plurality of vectors corresponding to the particular combination of needed user access contexts and the second plurality of vectors corresponding to the similar combination of needed user access contexts;

determining, by the computer, whether the distance between the first plurality of vectors corresponding to the particular combination of needed user access contexts and the second plurality of vectors corresponding to the similar combination of needed user access contexts is less than a defined maximum distance threshold value; and
adding, by the computer, the similar access policy as a new access policy for the resource in response to the computer determining that the distance between the first plurality of vectors corresponding to the particular combination of needed user access contexts and the second plurality of vectors corresponding to the similar combination of needed user access contexts is less than the defined maximum distance threshold value.

11. A computer system for automatically generating and implementing access policies, the computer system comprising:
a bus system;
a storage device connected to the bus system, wherein the storage device stores program instructions; and
a processor connected to the bus system, wherein the processor executes the program instructions to:
obtain an output of a needed user access context to access a resource from a trained machine learning model based on an extracted attribute of the resource input into the trained machine learning model; and
control the access to the resource by a user using the output of the needed user access context to access the resource as an access policy for the resource, wherein the computer system selects a particular combination of user access contexts as the access policy for the resource based on one of a most secure access policy selection process and a disjunct access policy selection process according to a level of security when multiple outputs of different combinations of needed user access contexts exist, and wherein a user access context includes absence of any other user when the user requested access to the resource at a location.

12. The computer system of claim 11, wherein the processor further executes the program instructions to:
extract an attribute of the resource to form the extracted attribute of the resource upon receiving a request to access the resource by the user; and
input the extracted attribute of the resource to the trained machine learning model.

13. The computer system of claim 11, wherein the processor further executes the program instructions to:
associate a user access context at an access to the resource by a trusted user who is authorized to access the resource with the attribute of the resource;
record association between the user access context and the attribute of the resource; and
input the user access context and the attribute of the resource as training data into a machine learning model to form the trained machine learning model.

14. A computer program product for automatically generating and implementing access policies, the computer program product comprising a computer-readable storage medium having program instructions embodied therewith, the program instructions executable by a computer to cause the computer to perform a method of:
obtaining, by the computer, an output of a needed user access context to access a resource from a trained machine learning model based on an extracted attribute of the resource input into the trained machine learning model; and controlling, by the computer, the access to the resource by a user using the output of the needed user access context to access the resource as an access policy for the resource, wherein the computer selects a particular combination of user access contexts as the access policy for the resource based on one of a most secure access policy selection process and a disjunct access policy selection process according to a level of security when multiple outputs of different combinations of needed user access contexts exist, and wherein a user access context includes absence of any other user when the user requested access to the resource at a location.

15. The computer program product of claim 14 further comprising:

extracting, by the computer, an attribute of the resource to form the extracted attribute of the resource upon receiving a request to access the resource by the user; and inputting, by the computer, the extracted attribute of the resource to the trained machine learning model.

16. The computer program product of claim 14 further comprising:

associating, by the computer, a user access context at an access to the resource by a trusted user who is authorized to access the resource with the attribute of the resource;

recording, by the computer, association between the user access context and the attribute of the resource; and inputting, by the computer, the user access context and the attribute of the resource as training data into a machine learning model to form the trained machine learning model.

17. The computer program product of claim 14 further comprising:

allowing, by the computer, access to resources by trusted users having various user access contexts upon accessing the resources, wherein the resources are protected by the computer;

extracting, by the computer, attributes of the resources accessed by the trusted users; and recording, by the computer, the various user access contexts of the trusted users when accessing the resources and the attributes of the resources in a resource access log.

18. The computer program product of claim 17 further comprising:

training, by the computer, a machine learning model using the various user access contexts of the trusted users when accessing the resources and the attributes of the resources recorded in the resource access log; and activating, by the computer, context-based access control to the resources by any user requesting access to the resources.

19. The computer program product of claim 14 further comprising:

receiving, by the computer, a request to access the resource by the user having a user access context from a client device via a network; and searching, by the computer, an access policy database for an access policy corresponding to the resource requested by the user.

20. The computer program product of claim 19 further comprising:

determining, by the computer, whether the access policy exists for the resource in the access policy database based on the search; and responsive to the computer determining that the access policy does not exist for the resource in the access policy database, instructing, by the computer, a user access context generator to generate the access policy for the resource with the needed user access context to access the resource using the trained machine learning model.

21. The computer program product of claim 20 further comprising:

responsive to the computer determining that the access policy does exist for the resource in the access policy database, determining, by the computer, whether the user access context of the user satisfies the needed user access context of the access policy for the resource; and responsive to the computer determining that the user access context of the user does not satisfy the needed user access context of the access policy for the resource, denying, by the computer, the access to the resource by the user.

22. The computer program product of claim 21 further comprising:

responsive to the computer determining that the user access context of the user does satisfy the needed user access context of the access policy for the resource, granting, by the computer, the access to the resource by the user.

* * * * *